United States Patent [19]

Hwang

[11] Patent Number: 5,312,269
[45] Date of Patent: May 17, 1994

[54] BATTERY SNAP

[76] Inventor: Steve H. S. Hwang, 5F, No. 3-1, Lane 191, Young Ho Rd., Chung Ho City, Taipei Hsien, Taiwan

[21] Appl. No.: 49,990

[22] Filed: Apr. 20, 1993

[51] Int. Cl.$^5$ ............................................. H01R 13/00
[52] U.S. Cl. ................................... 439/500; 439/627
[58] Field of Search ......... 439/626, 627, 500, 677–679

[56] References Cited

U.S. PATENT DOCUMENTS

| 3,980,388 | 9/1976 | Nailor, III | 439/627 |
| 4,226,497 | 10/1980 | Polonsky et al. | 439/500 |
| 4,239,322 | 12/1980 | Gordon, Jr. | 439/500 |

Primary Examiner—Joseph H. McGlynn
Attorney, Agent, or Firm—Bucknam and Archer

[57] ABSTRACT

A battery snap including an insulative plate covered within an insulative covering to hold two conductive rivets within the insulative covering, the insulative plate and the insulative covering having terminal holes through which the cylindrical rivet body of either conductive rivet protrudes, a cylindrical plug and a cylindrical socket respectively fastened to the cylindrical rivet body of either conductive rivet outside the insulative covering through rivet joints for connecting the socket and plug terminals of the battery to be connected, each conductive rivet having a horizontal extension strip with symmetrical wing leaves at one side for fastening the conductor of a respective electric wire being inserted through a wire hole on the insulative covering from the outside.

1 Claim, 1 Drawing Sheet

BATTERY SNAP

BACKGROUND OF THE INVENTION

The present invention relates to a battery snap for use in an electric device for connecting a battery.

A variety of mobile electric appliances are known and widely in use. These mobile electric appliances commonly use dry batteries for power supply, and have battery snaps for fastening the batteries.

Conventionally, the hot and neutral wires in electric appliances are directly soldered to the battery snap thereof. This connecting method is complicated to complete, and the wires may be disconnected from the battery snap easily when stretched. Further, because the tin solder may be oxidized easily, the conductivity of the battery snap will be affected.

SUMMARY OF THE INVENTION

The present invention eliminates the aforesaid drawbacks. The battery snap of the present invention is generally comprised of an insulative plate, two conductive rivets, an insulative covering, a cylindrical socket, and a cylindrical plug. Each conductive rivet has a horizontal extension strip with symmetrical wing leaves at one side, and therefore the conductive of the hot or neutral wire can be directly fastened to the horizontal extension strip by punching down the wing leaves. By inserting the cylindrical rivet into body of either conductive rivet respective holes on the insulative plate and the insulative covering and into a center through hole on the cylindrical socket or plug and then hammering it down to form another head, the cylindrical socket and the cylindrical plug are respectively fastened to the conductive rivets.

DETAILED DESCRIPTION OF THE PREFERRED EMBODIMENT

Figures 1, 2:
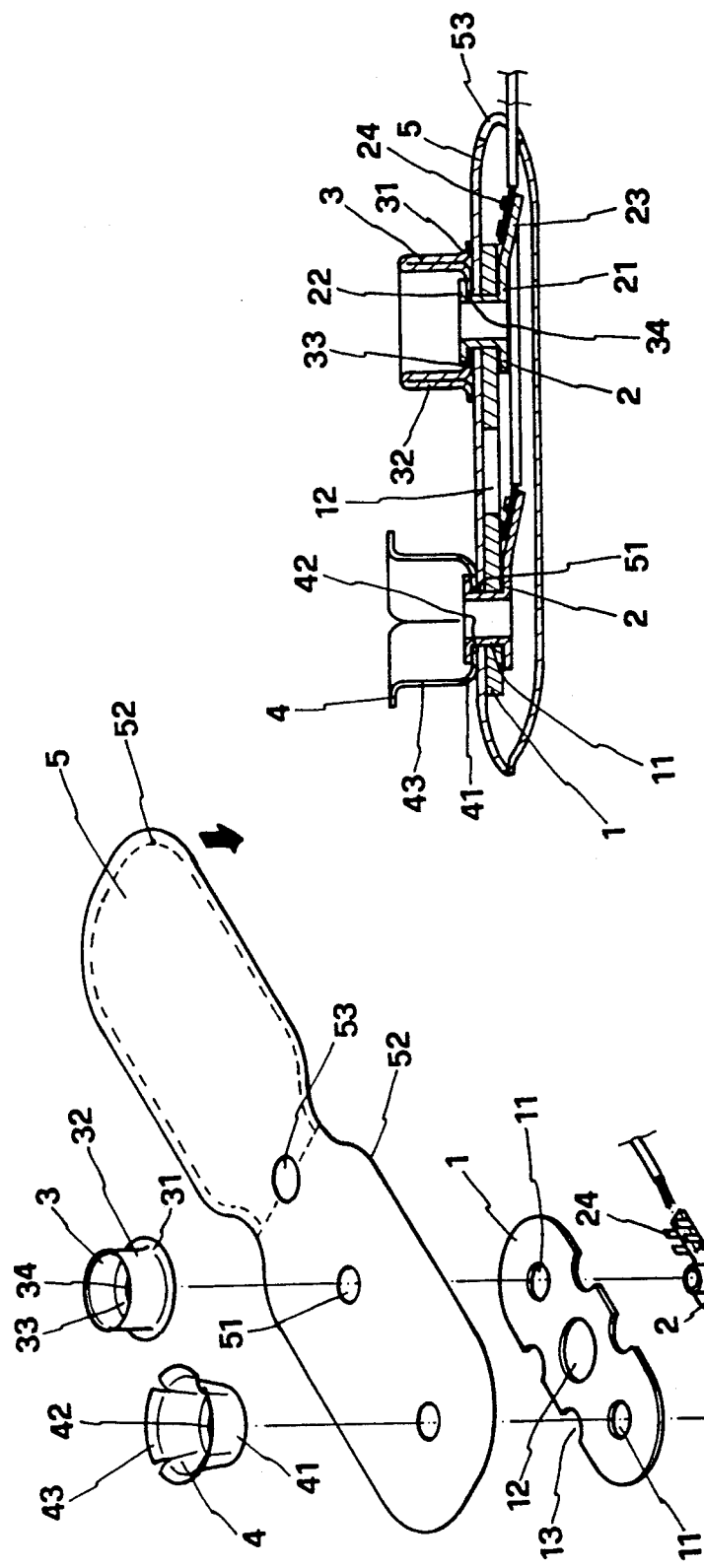
FIG. 1 is a perspective exploded view of a battery snap embodying the present invention.
FIG. 2 is a sectional assembly view thereof.

Referring to FIGS. 1 and 2, a battery snap as constructed in accordance with the present invention is generally comprised of an insulative plate 1, two conductive rivets 2, a cylindrical plug 3, a cylindrical socket 4, and an insulative covering 5.

The insulative plate 1 is made from a non-conductive material in a flat shape, having two spaced terminal holes 11, which receive the conductive rivets 2 respectively. Each conductive rivet 2 is integrally made from a conductive metal, having a cylindrical rivet body 22 upstanding from a flat head 21 thereof at the center for fastening the cylindrical plug 3 or socket 4, and a horizontal extension strip 23 with symmetrical wing leaves 24 at one side for fastening the conductor of a respective electric wire. The cylindrical plug 3 is integrally made from a conductive metal, having an outward horizontal flange 31 and an inward horizontal flange 33 respectively extended from a hollow cylindrical plug body 32 thereof at the bottom, and a center through hole 34 through the inward horizontal flange 33 through which the cylindrical rivet body 22 of the respective conductive rivet 2 is inserted and then hammered down to form another head. The cylindrical socket 4 is integrally made from a conductive metal, having a center through hole 42 through its longitudinal axis through which the cylindrical rivet body 22 of the respective conductive rivet 2 is inserted and then hammered down to form another head, and petaled border portion 43 around a socket body 41 thereof at the top. The cylindrical plug body 32 of the cylindrical plug 3 and the petaled border portion 43 of the socket body 41 of the cylindrical socket 4 are made for connecting to the terminal socket and the terminal plug of the battery to be fastened respectively. The insulative covering 5 can be made from a plastic cloth, having terminal holes 51 corresponding to the terminal holes 11 on the insulative plate 1 for inserting the cylindrical rivet body 22 of either conductive rivet 2, and a wire hole 53 at a suitable location for inserting electric wires. During the assembly process, the insulative covering 5 is folded up to hold the insulative plate 1 and the conductive rivets 2 on the inside and then peripherally seamed through a seam line 52. When sealed, the wire hole 53 is formed on the border.

When assembled, as shown in FIG. 2, the conductive rivets 2 and the insulative plate 1 are covered within the insulative covering 5, and the cylindrical rivet body 22 of each conductive rivet 2 is inserted through the respective terminal holes 11 on the insulative plate 1 and the insulative covering 5 into the center through hole 34 or 42 and hammered down to form another head in holding down the cylindrical plug 3 or cylindrical socket 4 outside the insulative covering 5, and the conductors of the electric wires are respectively and tightly fastened to the horizontal extension strip 23 of either conductive rivet 2 by the respective wing leaves 24.

What is claimed is:

1. A battery snap comprising:

a plate made from a non-conductive material in a flat shape, having two terminal holes spaced according to the pitch between the socket and plug terminals on either end of the battery to be connected;

two conductive rivets, each conductive rivet comprising a cylindrical rivet body upstanding from a flat head thereof at the center, and a horizontal extension strip with symmetrical wing leaves at one side for fastening the conductor of a respective electric wire , the rivet body of each rivet being received in a respective terminal hole of said plate;

a cylindrical plug fastened to the cylindrical rivet body of one of said two conductive rivets for connecting the socket terminal of the battery, said cylindrical plug comprising an outward horizontal flange and an inward horizontal flange respectively extended from a hollow cylindrical plug body thereof at the bottom, and a center through hole through the inward horizontal flange through which the cylindrical rivet body is inserted and then hammered down to form another head;

a cylindrical socket fastened to the cylindrical rivet body of the other one of said two conductive rivets for connecting the plug terminal of the battery, said cylindrical socket comprising a center through hole through which the cylindrical rivet body is inserted and then hammered down to form another head, and petaled border portion around a socket body thereof at the top; and an insulative covering comprised of an upper portion and a lower portion peripherally sealed to hold said insulative plate and said conductive rivets on the inside and having a wire hole for inserting the electric wires, said upper portion having terminal holes through which the cylindrical rivet body of either conductive rivet passes.

* * * * *